United States Patent
Park et al.

(10) Patent No.: US 7,301,573 B2
(45) Date of Patent: Nov. 27, 2007

(54) APPARATUS FOR AND METHOD OF EDGE ENHANCEMENT IN IMAGE PROCESSING

(75) Inventors: Sang-Hyun Park, Kyunggi-Do (KR); Jong-Sik Jeong, Seoul (KR); Yeon-Cheol Lee, Kyunggi-Do (KR); Kang-ju Kim, Kyunggi-Do (KR); Hyung-Man Park, Seoul (KR); Boo-Dong Kwak, Kyunggi-Do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 783 days.

(21) Appl. No.: 10/680,700

(22) Filed: Oct. 7, 2003

(65) Prior Publication Data

US 2005/0030396 A1    Feb. 10, 2005

(30) Foreign Application Priority Data

Aug. 7, 2003    (KR)    .................. 10-2003-0054648

(51) Int. Cl.
*H04N 5/208*    (2006.01)
*G06K 9/40*    (2006.01)
(52) U.S. Cl. .................................. 348/252; 382/266
(58) Field of Classification Search ................ 348/252, 348/222.1, 273; 382/266–269, 254
See application file for complete search history.

(56) References Cited

U.S. PATENT DOCUMENTS 5,113,252 A * 5/1992 Horie et al. ................ 358/528
6,563,537 B1 5/2003 Kawamura et al.
6,628,330 B1 * 9/2003 Lin ............................ 348/252
6,642,962 B1 * 11/2003 Lin et al. .................... 348/252

(Continued)

FOREIGN PATENT DOCUMENTS

JP    6-309452 A    11/1994

(Continued)

OTHER PUBLICATIONS

Park et al.; "A New Edge Dependent Deinterlacing Algorithm Based on Edge Patterns"; Nov. 18-19, 2004; Proceedings of the 2004 International Symposium on Intelligent Signal Processing and Communication Systems, 2004, ISPACS 2004; pp. 96-99.*

(Continued)

*Primary Examiner*—John M. Villecco
(74) *Attorney, Agent, or Firm*—Christensen O'Connor Johnson Kindness PLLC

(57) ABSTRACT

An apparatus for and a method of simultaneously performing edge detection and enhancement without any additional memory storage include an image sensor sensing an image to output image data, a line buffer receiving the image data to output the image data, a register storing the image data transmitted from the line buffer, an interpolation unit performing an interpolation operation on the image data received from the register, an edge detection unit performing an edge detection operation on the image data received from the register to output an edge detection signal in parallel to the interpolation operation of the interpolation unit according to a selection signal representing a pattern of the image data stored in the register, and an edge enhancement unit enhancing an output of the interpolation unit according to the edge detection unit of the edge detection unit.

27 Claims, 7 Drawing Sheets

U.S. PATENT DOCUMENTS

| | | | |
|---|---|---|---|
| 6,774,943 B1* | 8/2004 | Kao et al. | 348/252 |
| 7,139,022 B1* | 11/2006 | Raffy | 348/273 |
| 7,236,627 B2* | 6/2007 | Takahashi | 348/273 |
| 2003/0118231 A1* | 6/2003 | Uchida et al. | 382/164 |
| 2006/0291741 A1* | 12/2006 | Gomi et al. | 382/266 |
| 2007/0002154 A1* | 1/2007 | Kang et al. | 348/222.1 |

FOREIGN PATENT DOCUMENTS

| | | |
|---|---|---|
| JP | H07-107268 | 4/1995 |
| JP | 2001-231052 | 8/2001 |
| JP | 2001-292325 | 10/2001 |
| JP | 2002-510456 | 4/2002 |
| JP | 2003-018432 | 1/2003 |

OTHER PUBLICATIONS

Park et al.; "New Edge Dependent Deinterlacing Algorithm Based on Horizontal Edge Pattern"; Nov. 2003; IEEE Transactions on Consumer Electronics; vol. 49, Issue 4; pp. 1508-1512.*

Chen et al.; "Edge Detection on the Bayer Pattern"; Dec. 4-7, 2006; IEEE Asia Pacific Conference on Circuits and Systems, 2006, APCCAS 2006; pp. 1132-1135.*

* cited by examiner homogeneity operator

PRIOR ART

PRIOR ART

PRIOR ART

Fig. 3A

| R1 | G1 | R2 |
|----|----|----|
| G2 | B1 | G3 |
| R3 | G4 | R4 |

PRIOR ART

Fig. 3B

| G1 | R1 | G2 |
|----|----|----|
| B1 | G3 | B2 |
| G4 | R2 | G5 |

PRIOR ART

Fig. 3C

| G1 | B1 | G2 |
|----|----|----|
| R1 | G3 | R2 |
| G4 | B2 | G5 |

PRIOR ART

Fig. 3D

| B1 | G1 | B2 |
|----|----|----|
| G2 | R1 | G3 |
| B3 | G4 | B4 |

PRIOR ART

APPARATUS FOR AND METHOD OF EDGE ENHANCEMENT IN IMAGE PROCESSING

CROSS-REFERENCE TO RELATED APPLICATION

This application claims to benefit of Korean Patent Application No. 2003-54648, filed Aug. 7, 2003, in the Korean Intellectual Property Office, the disclosure of which is incorporated herein by reference.

BACKGROUND OF THE INVENTION

1. Field of the Invention

The present invention relates to apparatus for and method of performing edge enhancement in a widely used popular digital camera, such as a portable digital camera, having a low number of image pixels, and more particularly, to edge enhancement apparatus and method to simultaneously perform both an edge enhancement operation and an interpolation operation without any additional circuit or block for edge enhancement.

2. Description of the Related Art

In a portable digital camera or a widely used popular digital camera, a sensed image is not vivid since an image sensor and a lens are small in size, and a function of an image processing IC has been too much simplified for a cost reduction. In particular, a boundary of the sensed image becomes blurred. In order to prevent the sensed image from being blurred, an edge enhancement method has been employed in the digital camera to enhance the boundary of the sensed image to obtain a vivid sensed image.

An edge of the sensed image contains information about the sensed image itself. The edge of the sensed image represents the boundary at which a position, a shape, and a size of an object of the sensed image are changed. The edge of the sensed image is disposed on a point at which the brightness of the sensed image is changed from a high brightness level to a low brightness level or from the low brightness level to the high brightness level.

As described above, the edge enhancement method is used to obtain the vivid sensed image in the widely used popular camera having a number of image pixels less than a standard. Among a number of edge enhancement methods, a method of detecting an edge of an original image using various methods and adding the detected edge to the original image to enhance the edge of the original image has been widely used.

The edge enhancement method is classified into one of various methods according to a kind or type of an input image, and a fastest and simplest edge enhancement method is to calculate pixel data of a center pixel and adjacent pixels of the center pixel to determine a maximum value. This method is one of a homogeneity operator method and a difference operator method.

FIGS. 1A and 1B show views explaining conventional homogeneity operator and difference operator methods, respectively. As shown in FIG. 1A, the homogeneity operator method includes forming a window having 3×3 pixels, subtracting pixel values of adjacent pixels disposed around of a center pixel of the window from a pixel value of the center pixel to obtain differences, and outputting a maximum absolute value among absolute values of the differences as an output value. Since the homogeneity operator method performs obtaining the differences between the pixel value of the center pixel and the pixel values of the adjacent pixels of the window, 8 subtracting operations are required with respect to the center pixel of the window.

As shown in FIG. 1B, the difference operator method includes obtaining a first difference between pixel values of an upper left pixel and a lower right pixel of a center pixel, obtaining a second difference between pixel values between an upper center pixel and a lower center of the center pixel, obtaining a third difference between pixel values of an upper right pixel and a lower left pixel of the center pixel, and obtaining a fourth difference between pixel values of a middle left pixel and a middle right pixel of the center pixel. Since the difference operator method requires 4 subtracting operations with respect to the center pixel, the difference operator method is faster than the homogeneity operator method in performing the subtracting operation.

The above-described homogeneity and difference operator methods are performed with respect to a black/white image having a brightness component.

Various edge detecting methods are used for a color image which is not the black/white image. Generally, in the color image having an RGB (R, G, and B components) space, operations are performed with respect to the pixel values of each color components of R, G, or B, and a gray scale edge map is produced from operation results using the following formula 1.

$$G(x,y) = \sqrt{G^2_{red} + G^2_{green} + G^2_{blue}} \qquad \text{<Formula 1>}$$

Here, $G_{red}$ represents a pixel value of a red component, $G_{green}$ represents the edge map of a green component, and $G_{blue}$ represents the edge map of a blue component.

However, in an HSV (hue, saturation, and value (brightness or luminance) components) space, the edge of the color image is detected from the value (V) component among the hue (H), saturation (S), and value (V) components. Therefore, it is possible to detect the edge of the color image by using the value (V) component rather than all color components, such as the H, S, and V components, FIG. 2 shows a block diagram of a conventional edge detector detecting the edge of the color image using a luminance component. Referring to FIG. 2, the sensed image sensed by an image sensor 201 is stored in a memory 202 as a Bayer pattern. Since 3 or more data components are required to realize the color image, pixel values of three independent color (R, G, and B) components can be used as the data components. The image sensor 201 sensing the color image requires a color filter away (CFA) in which color sensors are arranged. In each color sensor of the image sensor 201, the pixel value of one of the color components is extracted with respect to each pixel, other color components of the pixel, which is not extracted with respect to the pixel, can be calculated through the CFA using information of adjacent pixels of the pixel. This method is a generally known Bayer pattern method corresponding to a CFA method. Restoring the color image through the image sensor 201 having the CFA is called interpolation and demosaicing.

The sensed image (image information) stored in the memory 202 is processed to a RGB pattern image in a 3×3 line interpolation unit 203.

Assuming that the interpolation unit 203 performs a 3×3 line interpolation method with respect to the image information stored as the Bayer pattern in a unit of a 3×3 window having the number of 3×3 pixels, since the Bayer pattern is one of four patterns, the 3×3 window is one of the following four patterns.

00: rgrgrg . . .
gbgbgb . . .

01: bgbgbg ...
grgrgr ...
10: gbgbgb ...
rgrgrg ...
11: grgrgr ...
bgbgbg ...

When a 3×3 line Bayer pattern which is shown in FIG. 3A is provided to the interpolation unit 203, RGB values of the RGB pattern are as follows.

R=(R1+R2+R3+R4)/4
G=(G1+G2+G3+G4)/4
B=B1

When the 3×3 line Bayer pattern which is shown in FIG. 3B is provided to the interpolation unit 203, the RGB values of the RGB pattern are as follows.

R=(R1+R2)/2
G=G3
B=(B1+B2)/2

When the 3×3 line Bayer pattern which is shown in FIG. 3C is provided to the interpolation unit 203, the RGB values of the RGB pattern are as follows.

R=(R1+R2)/2
G=G3
B=(B1+B2)/2

When the 3×3 line Bayer pattern which is shown in FIG. 3D is provided to the interpolation unit 203, the RGB values of the RGB pattern are as follows.

R=R1
G=(G1+G2+G3+G4)/4
B=(B1+B2+B3+B4)/4

The 3×3 line Bayer pattern interpolation method may include a method of obtaining a mean of pixel values of the adjacent pixels excluding the pixels having maximum and minimum pixel values as well as the above-described method. In order to perform the 3×3 line interpolation method, 3 line data should be simultaneously transmitted to an image processor.

The RGB pattern image interpolated in the interpolation unit 203 is processed in an edge detector 206 through YCrCb(YUV) pattern converter 204 and another memory 205.

However, when the interpolation and the edge enhancement are processed on the sensed image using the above conventional methods to realize an image processed block, a time delay occurs between an input image and an output image since the interpolation and the edge enhancement are performed in a unit of a frame, and also a frame buffer and an additional memory are required to temporarily store the input image and the edge map, respectively, since the interpolation and the edge enhancement are performed in a unit of a frame.

The sensed image is not vivid since functions of an image processor IC is too much simplified to sense a clear image as the input (sensed) image due to cost reduction, and the image sensor and a lens of the digital camera having a low number of pixels are small in size. Particularly, the boundary (edge) of an object in the sensed image becomes blurred. Although the edge of the object of the sensed image can be enhanced using the conventional edge enhancement method to obtain a more vivid image, an edge enhancement apparatus employing the conventional edge enhancement method requires an additional function unit (block) in addition to an interpolation processing unit (block) as shown in FIG. 2.

Japanese patent laid-open No. hei7-107268 discloses a conventional image processing apparatus for obtaining high resolution information for a sharp edge by calculating the high resolution information adjacent resolution information in a linear interpolation unit and by adding edge information of an edge information unit to linear interpolated high resolution information.

However, since the above conventional image processing apparatus is an apparatus for processing an edge processing operation after the interpolation has been performed, the additional function block is required in addition to the interpolation block. Moreover, the above conventional image processing apparatus cannot be properly employed in the digital camera or the widely known popular digital camera.

A new method of simultaneously performing the edge enhancement and the interpolation without any additional function block needs to be easily employed in the digital camera or the widely known popular digital camera regardless of the size or the cost of the image processing IC.

SUMMARY OF THE INVENTION

In order to solve the above and/or other problems, it is an aspect of the present invention to provide edge enhancement apparatus and method to obtain a more vivid image by providing a simple circuit enhancing an edge of an image to the apparatus without increasing an image processing unit in size.

It is another aspect of the present invention to provide edge enhancement apparatus and method to enhance an edge of an image without providing any line memory additional memory to store an input image, which is required when an edge enhancement is realized using additional function block, and an edge map, respectively.

It is another aspect of the present invention to provide edge enhancement apparatus and method to simultaneously processing 3×3 interpolation and edge enhancement to output an output image with only a few clocks delay without a maximum frame delay, which occurs when interpolation and edge enhancement blocks are realized in separate circuit blocks.

Additional aspects and/or advantages of the invention will be set forth in part in the description which follows and, in part, will be obvious from the description, or may be learned by practice of the invention.

To achieve the above and/or other aspects of the present invention, an apparatus for simultaneously performing edge detection and enhancement includes an image sensor sensing an image to output image data, a line buffer receiving the image data to output the image data, a register storing the image data transmitted from the line buffer, an interpolation unit performing an interpolation operation on the image data received from the register, an edge detection unit performing an edge detection operation on the image data received from the register to output an edge detection value in parallel to the interpolation operation of the interpolation unit according to a selection signal representing a pattern of the image data stored in the register, and an edge enhancement unit enhancing an output of the interpolation unit according to the edge detection unit of the edge detection unit.

According to another aspect of the present invention, a method of simultaneously performing edge detection and enhancement includes sensing an image to output image data, receiving the image data to output the image data in a line buffer, storing the image data in a register, performing an interpolation operation on the image data received from the register, performing an edge detection operation on the image data received from the register to output an edge detection value in parallel to the interpolation operation according to a selection signal representing a pattern of the image data, and enhancing an output of the interpolation operation according to the edge detection value.

BRIEF DESCRIPTION OF THE DRAWINGS

These and other advantages of the invention will become apparent and more readily appreciated from the following description of the preferred embodiments, taken in conjunction with the accompanying drawings of which:

FIGS. 3A through 3D show 3×3 windows formed when a Bayer pattern is interpolated using a 3×3 line interpolation method;

DETAILED DESCRIPTION OF THE PREFERRED EMBODIMENTS

Figure 1A:
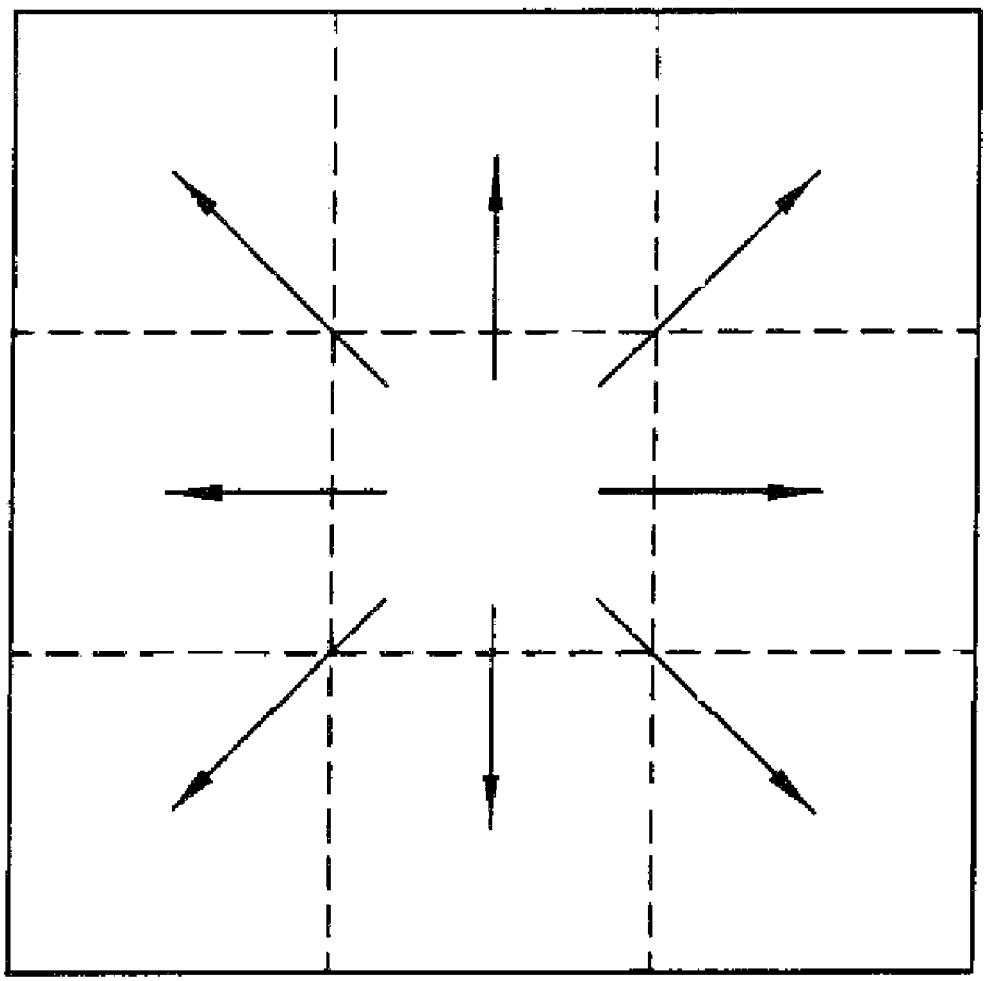
FIGS. 1A and 1B show views explaining conventional homogeneity operator and difference operator methods, respectively.
Figure 1B:
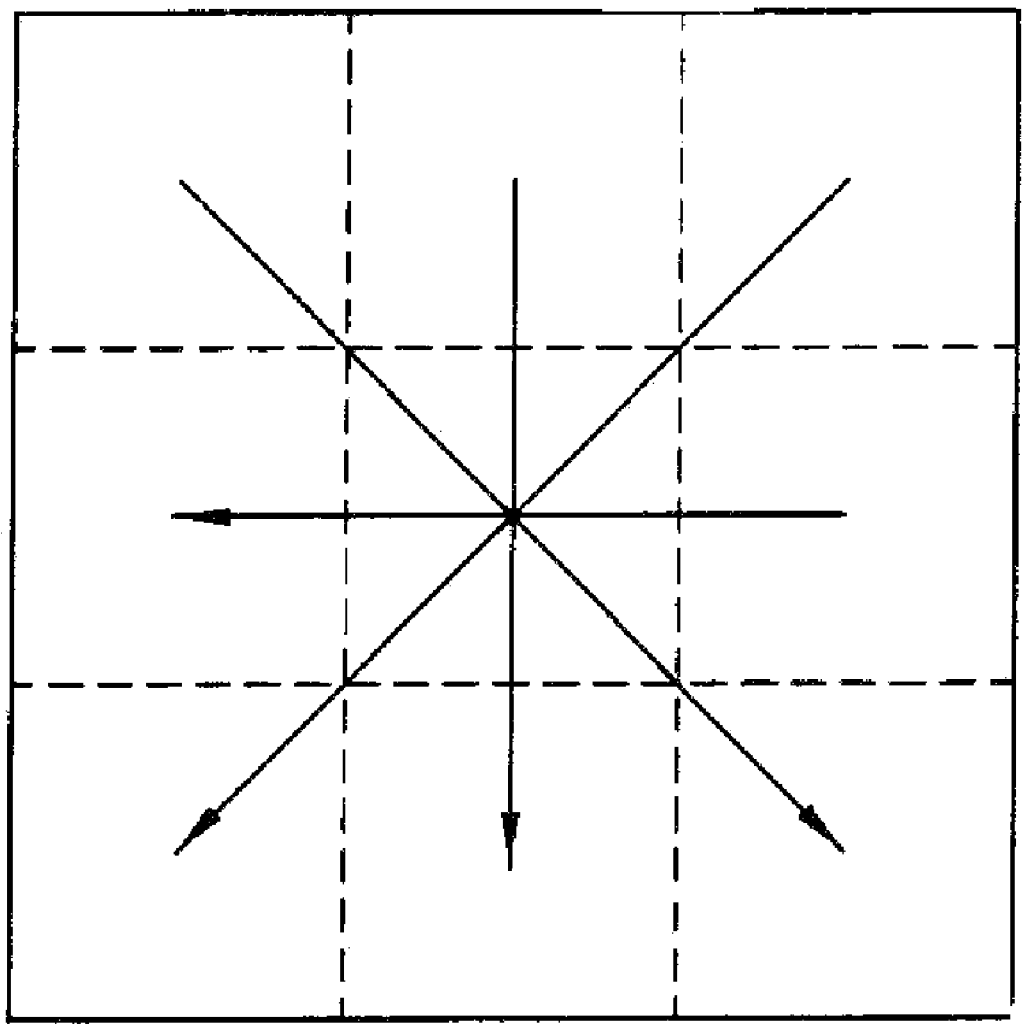
Figure 2:
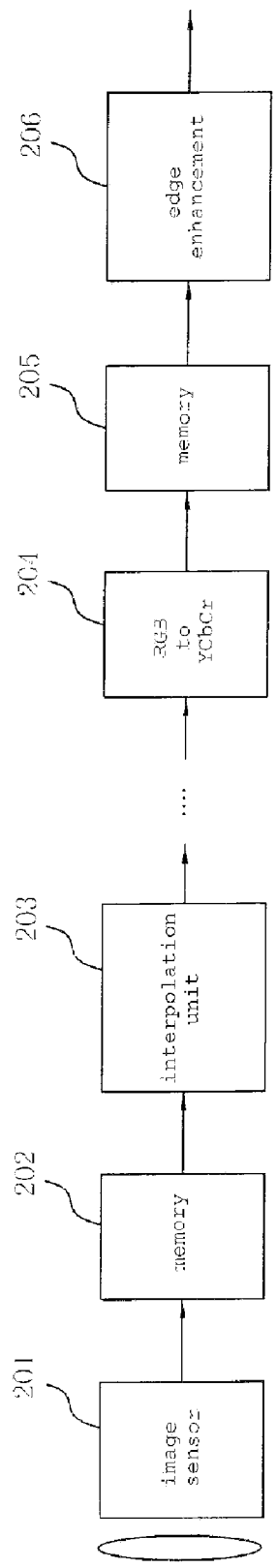
FIG. 2 shows a block diagram of a conventional edge detector detecting an edge using a luminance component.

Reference will now be made in detail to the present preferred embodiments of the present invention, examples of which are illustrated in the accompanying drawings, wherein like reference numerals refer to the like elements throughout. The embodiments are described below in order to explain the present invention by reference to the figures.

According to an aspect of the present invention, edge enhancement method and apparatus includes a method of detecting an edge from a brightness component (luminance component) of image data and enhancing the edge as a simplest method among various edge detection methods and enhancement methods. Since most edges show the same edge as the luminance component, the edge is detected and enhanced using the luminance component.

The luminance component corresponds to Y of a YCrCb or YUV space. According to CCIR-6-1 YCrCb color space conversion formula, G component among R, G, B components is most significant to Y since a coefficient of R is 77, a coefficient of G is 150, and a coefficient of B is 29. Therefore, Y of the YCrCb space or G component of an RGB color space can be used as the luminance component to detect and enhance the edge.

<CCIR-6-1 YCrCb Color Space Conversion Formula>

$Y=(77R+150G+29B)/256$           Range: 16~235

$Cb=(-44R-87G+131B)/256+128$     Range: 16~240

$Cr=(131R-110G-21B)/256+128$     Range: 16~240

In the method of detecting the edge using the luminance component, if an image sensor contains an image processor to output RGB data, such as YUV data, processed in an interpolation operation, it is desirable that the edge is detected using the luminance component, such as Y, of each pixel. If the RGB data which has not been processed in the interpolation operation is outputted, an RGB format of the RGB data needs to be converted into a YCrCb or YUV format so as to detect the edge from the RGB data in the image sensor which do not contain the image processor. In this case, an additional memory space is needed to be used in an edge detection process.

Since the edge enhancement method and apparatus perform the interpolation and the edge enhancement in a simplest structure in a small-sized image device which can be connected to a mobile device, such as a wireless phone according to an aspect of the present invention, the method of detecting and enhancing the edge using the G component which mostly affect the luminance component, is employed in the edge enhancement method and apparatus.

The edge detection method used in the edge enhancement method and apparatus compares a G value of a center pixel of a 3×3 window included in a frame with G values of adjacent pixels of the center pixel to detect the edge using differences between the G value of the center pixel and the G values of the adjacent pixels.

As shown in FIGS. 3A through 3D, with respect to 3×3 windows of 4 different Bayer patterns, the edge is detected by comparing the G value of the center pixel of the 3×3 window with the G values of the adjacent pixels of the center pixel and by obtaining a maximum difference among the differences between the G value of the center pixel and the G values of the adjacent pixels as the edge.

The edge enhancement method and apparatus perform detecting and enhancing the edge simultaneously according to another aspect of the present invention. The edge enhancement operation is not performed on the image data to be enhanced. The G value of the center pixel and the four G values of the four adjacent pixels are compared since one of the RGB components exists in the Bayer pattern.

FIGS. 3A and 3D show the center pixel having a B value and an R value, respectively, rather than the G value. Since the G value is data generated from the interpolation based on the B and R values, the G values is not data outputted from the image sensor but calculated data obtained from the interpolation of the B and R values. Accordingly, the edge is not calculated in FIGS. 3A and 3D.

In FIGS. 3B and 3C, a multiplication value obtained by multiplying 4 to the G value of the center pixel is subtracted from a sum of G values of the four adjacent pixels to calculate an edge detection value (signal) X, which is obtained from the following formula 2.

Edge detection value $(X)=4G3-(G1+G2+G4+G5)$     <Formula 2>

Here, the G value of the center pixel is multiplied by four since the number of the adjacent pixels is four. If the edge does not exist in a portion surrounded by the 3×3 window, the G values disposed in the 3×3 window are similar to each other, and a difference between the multiplication value and the sum is close to zero. That is, the detection value X becomes zero. To the contrary, if the edge exists in the 3×3 window, one of the G values of the adjacent pixels is greater than other G values due to differences of the luminance components, and an absolute value of the difference between the multiplication value and the sum becomes significant to show that the edge exists in the 3×3 window.

Even if the edge detection value X is detected from a point disposed adjacent to the center pixel, the above edge method can be used in the edge enhancement apparatus since there is no significant effect on an edge-enhanced image unless the image is enlarged or minimized and since another aspect of the present invention is to realize the edge enhancement in a most simplest manner.

In this case, a threshold value can be set. If the edge detection value X is greater than the threshold value, it is determined that there exists the edge in the 3×3 window. If the edge detection value X is not greater than the threshold value, it is determined that the edge does not exist in the 3×3 window.

The edge detection method and apparatus according to another aspect of the present invention realize the edge detection and the edge enhancement using a line memory used to perform a 3×3 interpolation operation in the edge enhancement without any additional memory.

Figure 4:
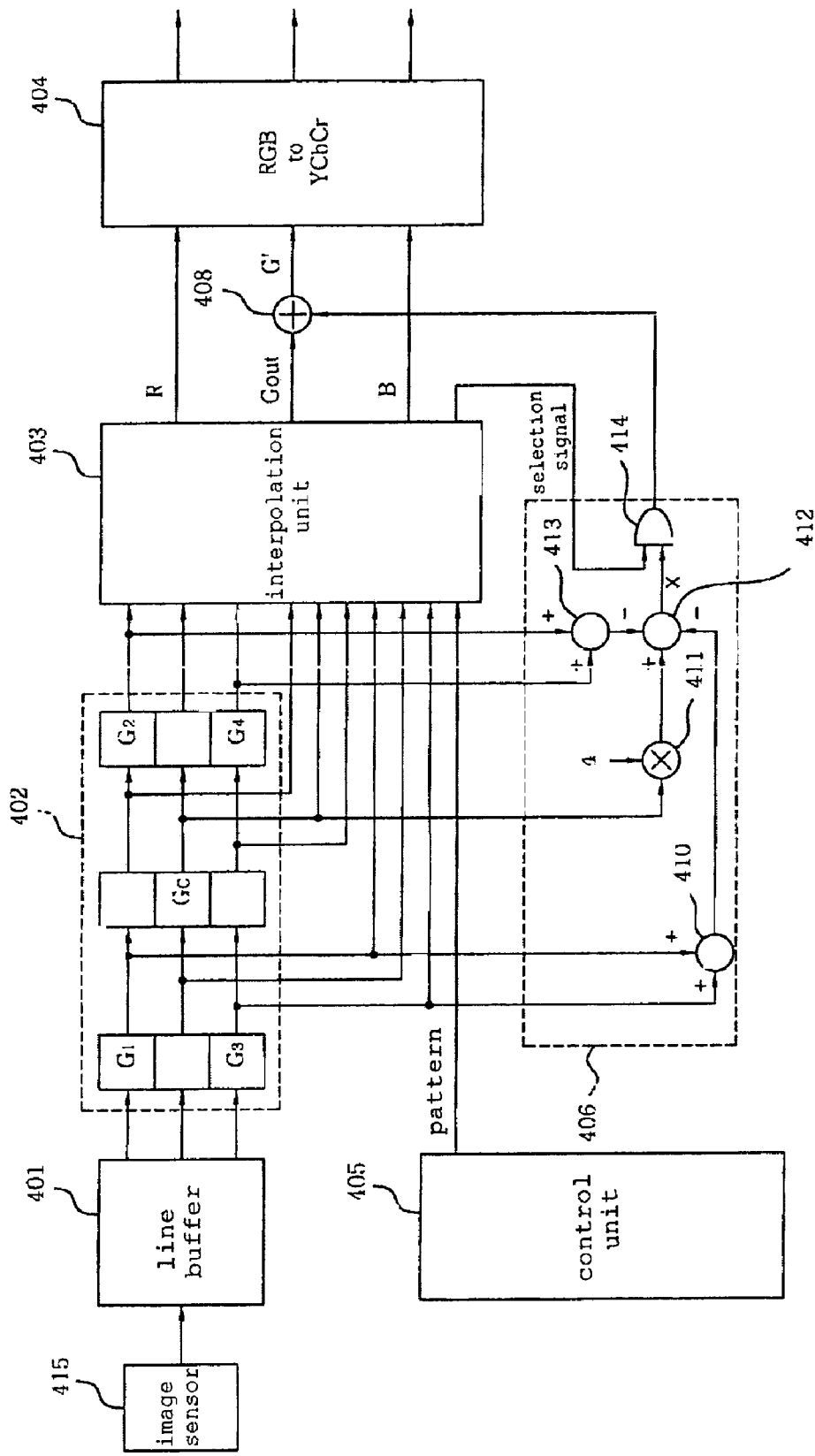
FIG. 4 is a block diagram of an edge enhancement apparatus according to an embodiment of the present invention.

FIG. 4 is a block diagram of the edge enhancement apparatus according to an embodiment of the present invention. An operation of the edge enhancement will be described in detail in reference with FIG. 4.

As shown in FIG. 4, image data of a sensed image having pixel lines in a unit of a frame is outputted from an image sensor 415 to a line buffer 401. The line buffer 401 temporarily stores the input image data and outputs the stored image data in a unit of 3 lines for the interpolation. The 3 line image data is inputted to an interpolation unit 403 through a register 402.

An output of the line buffer 401 is transmitted to a left terminal of the register 402 and then shifted to a right terminal of the register 402. Accordingly, the image date corresponding to the 3×3 window is stored in the register 402, and the 3×3 window is shifted through the register 402 according to each clock. The 3×3 window is shifted rightward according to the clock to be inputted to the interpolation unit 403.

The interpolation unit 403 performs the 3×3 line interpolation on the image data of pixel values corresponding to 9 pixels received from the register 402 as described above.

An RGB to YCrCb conversion unit 404 converts the RGB data, which is interpolated in the interpolation unit 403, into the YCrCb format data or the YUV format data to be outputted to a display apparatus or a storage unit.

FIG. 4 shows circuits, such as a control unit 405 and an edge detector 406, to perform the edge detection and the edge enhancement.

The control unit 405 transmits a pattern signal representing information about a pattern of the 3×3 window to the interpolation unit 403. The pattern signal representing the Bayer pattern generated from the image sensor 415 is transmitted to the interpolation unit 403.

In a case that the image sensor 415 does not include the image processor, the image data transmitted from the register 402 to the interpolation unit 403 is the Bayer pattern.

In this case, the Bayer pattern is one of the following four patterns.

00: rgrgrg . . .
gbgbgb . . .
01: bgbgbg . . .
grgrgr . . .
10: gbgbgb . . .
rgrgrg . . .
11: grgrgr . . .
bgbgbg . . .

That is, the control unit 405 transmits to the interpolation unit 403 the pattern signal representing which one of the four patterns is the Bayer pattern transmitted to the interpolation unit 403.

When the pixel value of the center pixel constituting the 3×3 window stored in the register 402 is the G value, the G value is multiplied by 4, and the multiplication is subtracted from the sum of the four values disposed adjacent to the center pixel to generate the edge detection value X.

When the pixel value of the center pixel of the 3×3 window is not the G value, the edge detection value X is not transmitted to the first adder 408.

As shown in FIG. 4, the interpolation unit 403 receives the pattern signal from the control unit 405 to determine the Bayer pattern received from the register 402.

The interpolation unit 403 generates a selection signal of 0 value to the edge detection unit 406 to disable the edge detection unit 406 when the pattern of the window inputted to the interpolation unit 403 shows that the pixel value of the center pixel is the B or R values rather than the G value as shown in FIGS. 3A and 3D. The interpolation unit 403 generates the selection signal of 1 value to an AND gate 414 of the edge detection unit 406 to output the edge detection value X of the edge detection unit 406 to a first adder 408 when the pattern of the window inputted to the interpolation unit 403 shows that the pixel value of the center pixel is the G value as shown in FIGS. 3B and 3C.

The edge detection unit 406 performs a calculation operation on the G value Gc of the center pixel, which is disposed in a center portion of the 3×3 window, and G1, G2, G3, G4 values of the pixels disposed adjacent to the center pixel. The edge detection value X is calculated by the following formula.

Edge detection value $(X) = 4Gc - (G1+G2+G3+G4)$

In the calculation operation of the edge detection unit 406, a second adder 410 adds G1 to G3 to output a first sum of G1+G3, a multiplier 411 multiplies the G value Gc of the center pixel by 4 to output a multiplication value 4Gc, a third adder 413 adds G2 to G4 to output a second sum G2+G4, and a fourth adder adds the first sum G1+G3, the multiplication value 4Gc, and the second sum G2+G4 to output the edge detection value X, that is, 4Gc−(G1+G2+G3+G4).

As described above, when the edge does not exist in a portion of the image data corresponding to the 3×3 window stored in the register 402, the edge detection value X corresponding to the addition value of 4Gc−(G1+G2+G3+G4) becomes near zero, that is, the edge detection value (X)=0, since most pixel values of the pixels disposed in the 3×3 window are similar to each other. To the contrary, when the edge exists in the portion of the image data corresponding to the 3×3 window stored in the register 402, an absolute value of the edge detection value X corresponding to the addition value of 4Gc−(G1+G2+G3+G4) becomes a greater value, that is, the edge detection value (X) varies, since some of the pixel values of the pixels disposed around the center pixel of the 3×3 window are different from each other according the luminance component.

The edge detection value X outputted from the fourth adder 412 and the selection signal outputted from the interpolation unit 403 are inputted to the AND gate 414 for an adding operation. The interpolation unit 403 determines the Bayer pattern based on the pattern signal transmitted from the control unit 405, transmits the selection signal of the 0 value to the AND gate 414 when the pixel value of the center pixel of the 3×3 window is the R or B value rather than the G value stored in the register 402, and transmits the selection signal of the 1 value to the AND gate 414 when the pixel value of the center pixel of the 3×3 window is the G value.

If the selection signal is 0, that is, a disabled state representing that the pixel value of the center pixel is the R or B value rather than the G value, the edge detection value X is not transmitted to the first adder 408. If the selection signal is 1, that is an enabled state representing that the pixel value of the center pixel is the G value, the edge detection value X is transmitted to the first adder 408.

The edge detection value X is added to an output Gout of the interpolation unit 403 in the first adder 408 to enhance the output Gout. Accordingly, if the image data includes the edge after being interpolated, the image data is enhanced to output the enhanced value (signal) G' to the RGB to YCrCb (YUV) conversion unit 404 as follows.

$$G'=Gout+X$$

Figure 5:
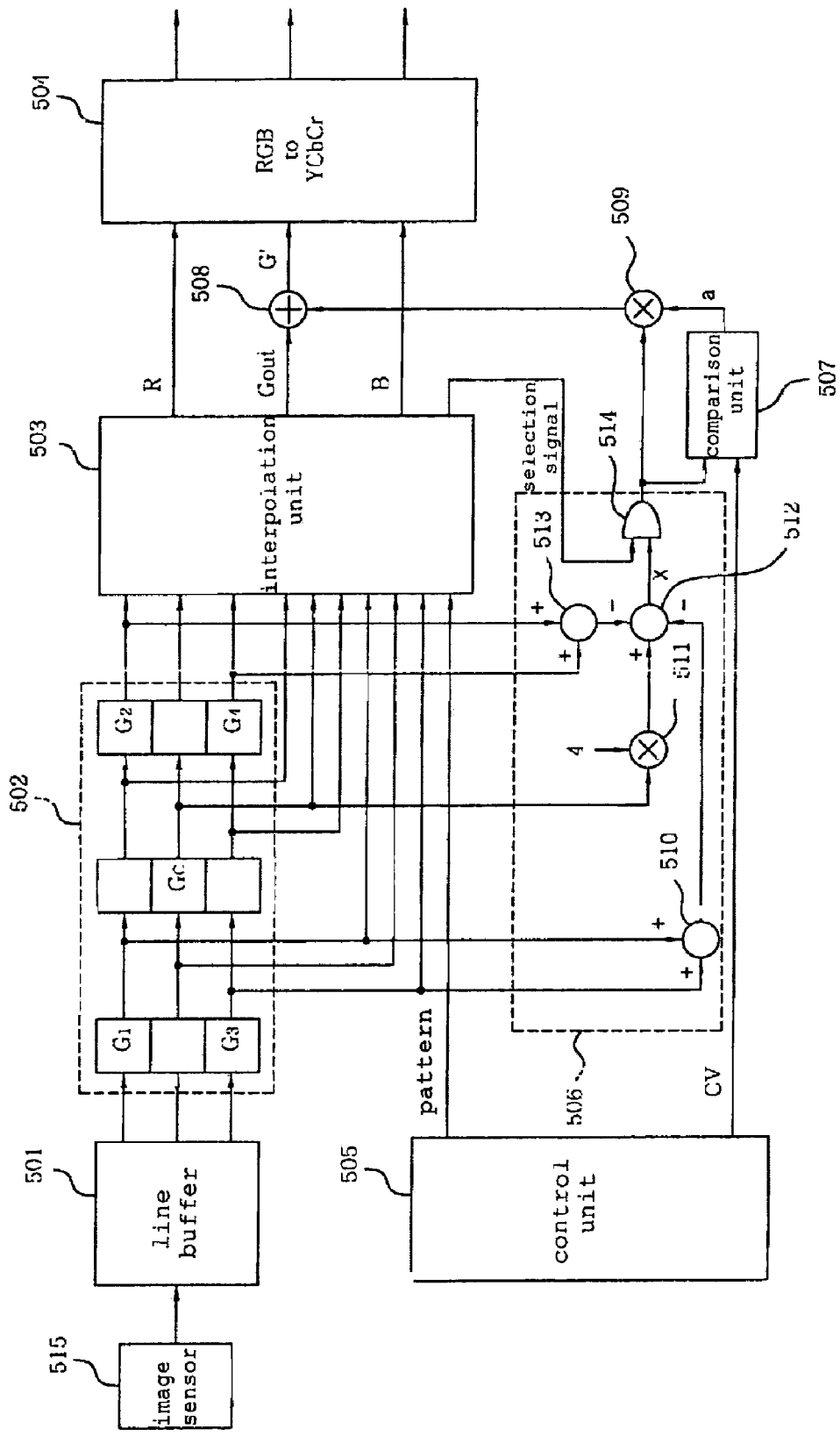
FIG. 5 is a block diagram of another edge enhancement apparatus according to another embodiment of the present invention.

FIG. 5 is a block diagram of another edge enhancement apparatus having an image sensor 515, a line buffer 501, a register 502, an interpolation unit 503, an RGB to YCrCb (YUV) conversion unit 504, a control unit 505, an edge detection unit 506, a comparison unit 507, and a first adder 508 according to another embodiment of the present invention. The edge detection unit 506 includes a second adder 510, a first multiplier 511, a third adder 513, a fourth adder 512, and an AND gate 514. Referring to FIG. 5, the control unit 505 determines a predetermined reference value CV corresponding to the edge detection signal X, and the edge is enhanced when the edge detection signal X detected in the edge detecting unit 506 is greater than the reference value CV.

The block diagram of FIG. 5 is similar to the block diagram of FIG. 4 except the control unit 404 determining the reference value CV, the comparison unit 507 comparing the edge detection value X with the reference value CV, and a second multiplier 509.

The edge detection value X outputted from the fourth adder 512 of the edge detection unit 506 is inputted to the AND gate together with a selection signal outputted from the interpolation unit 503 so as to perform the addition operation. The interpolation unit 503 determines the Bayer pattern based on the pattern signal from the control unit 505, transmits to the edge detection unit 506 the selection signal of the 0 value when the pixel value of the center pixel of the 3×3 window is not the G value but the R or B value, and transmits to the edge detection unit 506 the selection signal of the 1 value when the pixel value of the center pixel of the 3×3 window is the G value.

When the selection signal is the 0 value, that is, when the pixel value of the center pixel of the 3×3 window is not the G value but the R or B value, the edge detection signal x is not transmitted to the comparison unit 507 and the first adder 508. To the contrary, when the selection signal is the 1 value, that is, when the pixel value of the center pixel of the 3×3 window is the G value, the edge detection value X is transmitted to the comparison unit 507 and the first adder 508, and the comparison unit 507 compares the reference value CV inputted from the control unit 505 with the edge detection signal X outputted from the edge detection unit 506 so as to determine the existence of the edge in the 3×3 window.

The reference value CV outputted from the control unit 505 may be adjusted according to a level of the edge enhancement. If the reference value CV is set to a low value, a dimmed portion of the 3×3 window, that is, a portion having a very small change of an object of the image data, can be enhanced to make a bluffed boundary of the object enhanced. If the reference is set to a high value, another portion of the 3×3 window in which the image data is changed, the boundary of the object is enhanced to be vivid. A necessity of the edge enhancement varies according to kinds or usages of the image data, and the reference CV is adjusted according to the necessity of the edge enhancement.

In a case of an 8 bit image frame, G value is one of 0 through 255. Generally, the reference value is set to 64. The edge exists when the edge detection value X is greater than the reference value CV, and the edge does not exist when the edge detection value X is not greater than the reference value CV.

The comparison unit 507 outputs a weight a when the edge exists according to a comparison result of the edge detection value X and the reference value CV. The weight outputted from the comparison unit 507 is multiplied with the edge detection value X outputted from the edge detection unit 506 so as to output the modified detection signal a·X, and the modified detection signal a·X is added to the G output value Gout of the interpolation unit 503 among outputs of the interpolation unit 503. Therefore, if the edge exists after the pixel value is interpolated in the interpolation unit 503, the enhanced signal G' transmitted to the RGB to YCrCb conversion unit 504 may be calculated from the following formula.

$$G'=G_{out}+a·X$$

As shown in the above formula, the G output value Gout of the interpolation unit 503 is enhanced according to the weight. If the weight a is set to a relatively large value, the edge enhancement operation is excessively performed so that the object of the image data is blurred. It is possible that the weight a is in a range between 0 to 1.

If it is determined that the edge does not exist according to the comparison result of the edge detection value X and the reference value CV in the comparison unit 507, the comparison unit 507 outputs the 0 value which is multiplied by the edge detection value X in the second multiplier 509 so that the edge detection value X is offset. Therefore, the output Gout of the interpolation unit 503 is not enhanced to be outputted to the RGB to YCrCb conversion unit 504. That is, G'=Gout.

As described above, since the register 502 providing the 3 line image data to the interpolation unit 503 performing the 3×3 interpolation is simultaneously or commonly used for edge detection and enhancement circuits, such as the control unit 505, the edge detection unit 506, the comparison unit 507, and the second multiplier 509, any additional memory is not necessary, nor a manufacturing cost is increased. Therefore, this structure does not affect an entire IC area of an image processing unit even if the above described edge detection and enhancement circuits are used in the image processing unit of the edge enhancement apparatus.

According to the edge detection and enhancement apparatus, a simple circuit is added to enhance the edge to obtain a vivid image without increasing the entire IC area.

According to the edge detection and enhancement apparatus, if the edge detection and enhancement circuits are realized in a separate block (unit) in the image processing unit in order to enhance the edge of the image, any line memory and any additional memory required to store the edge map are not necessary.

According to the edge detection and enhancement apparatus, the 3×3 interpolation and the edge enhancement are simultaneously performed without a clock delay compared to a possibility that a frame delay occurs if the edge detection and enhancement circuits are realized in a separate block (unit) in the image processing unit in order to enhance the edge of the image.

Although a few preferred embodiments of the present invention have been shown and described, it would be appreciated by those skilled in the art that changes may be made in this embodiment without departing from the principle and sprit of the invention, the scope of which is defined in the claims and their equivalent.

What is claimed:

1. An apparatus for performing edge enhancement, comprising:
an image sensor sensing an image to output image data;
a line buffer receiving the image data to output the received image data; a register storing the image data transmitted from the line buffer;
an interpolation unit performing an interpolation operation on the image data received from the register;
an edge detection unit performing an edge detection operation on the image data received from the register in parallel to the interpolation operation of the interpolation unit and selectively outputting an edge detection value according to a selection signal representing a pattern of the image data stored in the register;
and an edge enhancement unit enhancing an output of the interpolation unit according to the edge detection value output by the edge detection unit.

2. The apparatus of claim 1, wherein the selection signal is output by the interpolation unit, and the edge detection unit outputs the edge detection value when the selection signal is in an enabled state.

3. The apparatus of claim 1, further comprising: a comparison unit comparing the edge detection value with a reference value, wherein the edge enhancement unit enhances the output of the interpolation unit when the edge detection value is greater than the reference value.

4. The apparatus of claim 3, further comprising: a control unit outputting a pattern information signal representing a pattern of the image data stored in the register, and outputting the reference value to the comparison unit.

5. The apparatus of claim 1, wherein the line buffer outputs the image data sensed by the image sensor in a unit of 3 lines.

6. The apparatus of claim 1, wherein the register stores the image data in a unit of a window in which 3×3 pixels are disposed.

7. The apparatus of claim 1, wherein the edge detection unit receives the image data to generate the edge detection value according to a formula of $X=4Gc-(G_1+G_2+G_3+G_4)$ where X is the edge detection value, Gc is a pixel value of a center pixel of a window in which 3×3 pixels are disposed among the image data, and $G_1$, $G_2$, $G_3$, and $G_4$ are pixel values of adjacent pixels disposed adjacent to the center pixel of the window.

8. The apparatus of claim 3, further comprising: a comparison unit comparing the edge detection value with a reference value to output a weight, wherein the weight is not zero when the edge detection value is greater than the reference value, and is zero when the edge detection value is not greater than the reference value, and the edge detection value is modified to a multiplication value of the weight and the edge detection value so that the output of the interpolation unit is enhanced according to the multiplication value.

9. The apparatus of claim 3, wherein the interpolation unit outputs R, G, and B values, and the edge enhancement unit adds the multiplication value to the G value.

10. A method of performing edge enhancement, the method comprising:
sensing an image to output image data;
receiving the image data to output the image data in a line buffer;
storing the image data in a register;
performing an interpolation operation on the image data received from the register;
performing an edge detection operation on the image data received from the register in parallel to the interpolation operation and selectively outputting an edge detection value according to a selection signal representing a pattern of the image data; and
enhancing an output of the interpolation operation according to the edge detection value.

11. The method of claim 10, wherein the enhancing of the output of the interpolation operation comprises: adding the edge detection value to the output of the interpolation operation.

12. The method of claim 11, wherein the enhancing of the output of the interpolation operation comprises: comparing the edge detection value with a reference value; outputting a multiplication value of the edge detection value and a weight generated when the edge detection value is greater than the reference value; outputting zero value when the edge detection value is not greater than the reference value; and adding one of the multiplication value or the zero value to the output of the interpolation operation.

13. The method of claim 10, wherein the enhancing of the output of the interpolation operation comprises: setting a reference value; comparing the edge detection value with the reference value; outputting a multiplication value of the edge detection value and a weight generated when the edge detection value is greater than the reference value; outputting zero value when the edge detection value is not greater than the reference value; and adding one of the multiplication value or the zero value to the output of the interpolation operation.

14. The method of claim 10, wherein the outputting of the image data in the line buffer comprises: outputting the image data in a unit of 3 lines.

15. The method of claim 10, wherein the storing of the image data in the register comprises: storing the image data in a unit of a window in which 3×3 pixels are disposed.

16. The method of claim 10, wherein the performing of the interpolation operation comprises: outputting a selection signal representing a pattern of the image data stored in the register.

17. The method of claim 16, wherein the performing of the edge detection operation comprises: performing the edge detection operation when the selection signal is in an enabled state.

18. An apparatus for performing edge enhancement, comprising:
a memory unit storing image data in a unit of a window having lines each having a predetermined number of pixels;
an interpolation unit performing an interpolation operation on the image data received from the memory unit;
an edge detection unit performing an edge detection operation on the image data received from the memory unit to detect an edge detection signal and selectively outputting the edge detection signal according to a pattern of the image data stored in the memory unit when the interpolation unit performs the interpolation; and
an edge enhancement unit receiving the edge detection signal selectively output from the edge detection unit and enhancing an output of the interpolation unit according to the edge detection signal.

19. The apparatus of claim 18, further comprising: an image sensor sensing an image to output the image data.

20. The apparatus of claim 18, further comprising: a control unit generating a pattern signal representing a pattern of the image data stored in the memory unit in a unit of the window, wherein the interpolation unit performs the interpolation according to the pattern signal.

21. The apparatus of claim 18, wherein the pixels comprise a center pixel and adjacent pixels, and the edge detection unit detects the edge detection signal according to a multiplication value of a pixel value of the center pixel and the number of the adjacent pixels and a sum of the pixel values of the adjacent pixels.

22. The apparatus of claim 21, wherein the interpolation unit outputs R, G, and B components, and the edge enhancement unit adds the edge detection signal to the G component to enhance the G component.

23. The apparatus of claim 21, wherein the interpolation unit outputs a selection signal when it is determined that the pixel value of the center pixel is the G component, and the edge detection unit outputs the edge detection signal according to the selection signal.

24. The apparatus of claim 21, wherein the edge detection unit modifies the edge detection signal according to a reference value representing a level of the edge enhancement level to generate the modified edge detection signal, and the edge enhancement unit adds the modified edge detection signal to an output of the interpolation unit.

25. The apparatus of claim 18, wherein the edge detection unit and the interpolation unit simultaneously perform the edge detection operation and the interpolation operation, respectively.

26. The apparatus of claim 18, wherein a time delay occurs with respect to the image data when the edge detection unit detects the edge detection signal, and the time delay is a period of time during which pixel values of the pixels disposed in the window are stored in the memory unit.

27. The apparatus of claim 18, wherein the interpolation unit and the edge detection unit are coupled between the memory unit and the edge enhancement unit in parallel.

* * * * *